United States Patent [19]

Yeager et al.

[11] Patent Number: 4,757,107

[45] Date of Patent: Jul. 12, 1988

[54] FLAME RETARDANT POLYPHENYLENE ETHER BLENDS

[75] Inventors: Gary W. Yeager; Dwain M. White; James E. Pickett, all of Schenectady; Arnold Factor, Scotia; William R. Haaf, Voorheesville, all of N.Y.

[73] Assignee: General Electric Company, Schenectady, N.Y.

[21] Appl. No.: 92,784

[22] Filed: Sep. 3, 1987

[51] Int. Cl.$^4$ .................................................. C08K 3/16
[52] U.S. Cl. ...................................... 524/435; 524/399
[58] Field of Search ................................ 524/435, 399

[56] References Cited

U.S. PATENT DOCUMENTS

| | | | |
|---|---|---|---|
| 2,563,772 | 8/1951 | Cheney | 524/435 |
| 3,239,482 | 3/1966 | Rapp | 524/411 |
| 3,983,185 | 9/1976 | Dorfman et al. | 524/399 |

FOREIGN PATENT DOCUMENTS 2236893 2/1975 France .

Primary Examiner—Veronica P. Hoke
Attorney, Agent, or Firm—William A. Teoli; James C. Davis, Jr.; James Magee, Jr.

[57] ABSTRACT

An effective amount of an iron halide has been found to impart improved flame retardant properties to polyphenylene ether styrene resin blends.

8 Claims, No Drawings

FLAME RETARDANT POLYPHENYLENE ETHER BLENDS

CROSS-REFERENCE TO RELATED APPLICATIONS

Reference is made to copending applications, Ser. Nos. 092,786 and 092,785 filed concurrently herewith, assigned to the same assignee as the present invention and incorporated herein by reference.

BACKGROUND OF THE INVENTION

Prior to the present invention, as shown by Abolins et al., U.S. Pat. No. 4,024,093, assigned to the same assignee as the present invention and incorporated herein by reference, flame retardant polyphenylene ether resin compositions were provided by employing a halogenated flame retardant, such as hexabromobiphenyl, and an effective amount of an organic iron compound, such as ferric stearate.

Japanese Pat. No. J59-226046 (June 7, 1983) shows that ammonium halides can be used as flame retardants for polyphenylene ether, styrene resin blends. For example, blends of 30 parts by weight of polyphenylene ether, 70 parts by weight of high impact polystyrene required 10 parts by weight of ammonium bromide or ammonium chloride for a satisfactory degree of flame retardancy.

It would be desirable to provide flame retardant blends of polyphenylene ether and styrene resin which were substantially free of significant amounts of polyhalogenated biphenyl or ammonium halides.

The present invention is based on our discovery that flame retardant blends of polyphenylene ether and styrene resin can be obtained exhibiting a V-0 rating in accordance with the UL-94 test as defined hereinafter, by incorporating into the polyphenylene ether/polystyrene resin blend, a minor amount of an iron halide, such as iron (III) bromide. We have found that as little as 0.1 to 3 parts of iron halide salt, per 100 parts by weight of polyphenylene ether-styrene resin blend will provide effective flame retardant results.

The expressions "V-0", "V-1", and "FOT" (average flame out time), as used hereinafter, describe flame retardance using 5"×½"×(⅛" or 1/16") test bars of blends of polyphenylene ether and polystyrene resin. The test bars are twice suspended over a ¾" Bunsen burner flame in accordance with UL-94 Bulletin of Jan. 24, 1980 for Flammability of Plastic Materials. A UL-94 V-0 rating has the following criteria:

A. Not have any specimens which burn with flaming combustion for more than 10 seconds after either application of the test flame.

B. Not have a total flaming combustion time exceeding 50 seconds for the 10 flame applications for each set of five specimens.

C. Not have any specimens which burn with flaming or glowing combustion up to the holding clamp.

D. Not have any specimens which drip flaming particles that ignite dry absorbent surgical cotton located 12 inches (305 mm) below the test specimen.

E. Not have any specimens with glowing combustion which persists for more than 30 seconds after the second removal of the test flame.

STATEMENT OF THE INVENTION

There is provided by the present invention, flame retardant polyphenylene ether blends comprising,
(a) polyphenylene ether,
(b) polystyrene resin, and
(c) an effective amount of iron halide.

Polyphenylene ethers which can be utilized in the practice of the present invention to make the flame retardant polyphenylene ether blends consist essentially of chemically combined structural units having the formula,

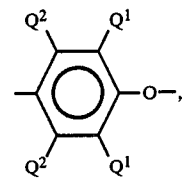

where in each of said units, independently, each $Q^1$ is halogen, primary or secondary lower alkyl (i.e., alkyl containing up to 7 carbon atoms), alkenyl, such as allyl, phenyl, haloalkyl, aminoalkyl, glycidyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymer and copolymer polyphenylene ethers are known. The homopolymers include those containing, for example, 2,6-dimethyl-1,4-phenylene ether units. The copolymers include random copolymers containing such units in combination with (for example) 2,3,6-trimethyl-1,4-phenylene ether units. Many suitable random copolymers, as well as homopolymers, are disclosed in the patent literature.

Particularly useful are poly(2,6-dimethyl-1,4-phenylene ethers). Suitable polymers generally have a number average molecular weight within the range of about 5,000–40,000 and a weight average molecular weight within the range of about 20,000–80,000, as determined by gel permeation chromatography. Their intrinsic viscosities are preferably in the range of about 0.35–0.6 dl/g, as measured in chloroform at 25° C.

Also known are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other polyphenylene ethers are coupled polymers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

Polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. For the most part, they contain at least one heavy metal compound such as a copper, manganese or cobalt compound, usually in combination with various other materials.

Catalyst systems containing a copper compound are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Other catalyst systems contain manganese compounds. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also known are cobalt-containing catalyst systems. Suitable manganese and cobalt-containing catalyst systems for polyphenylene ether preparation are known in the art by reason of disclosure in numerous patents and publications.

Polystyrene or "vinyl aromatic resin" which can be blended with the polyphenylene ethers utilized in the practice of the present invention, preferably have at least 25 mole percent, based on the total moles of chemically combined vinyl aromatic units, of vinyl aromatic units of the formula,

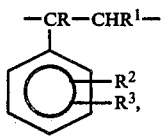

wherein R and $R^1$ are selected from the group consisting of hydrogen and lower alkyl or alkenyl groups of from 1 to 6 carbon atoms; $R^2$ and $R^3$ are selected from the group consisting of chloro, bromo, hydrogen and lower alkyl of from 1 to 6 carbon atoms.

Materials which may be copolymerized with styrene or substituted styrene to produce the vinyl aromatic resin include those having the general formula

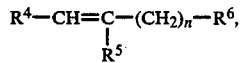

where $R^4$ and $R^5$ are members selected from the class consisting of hydrogen, halogen, an alkyl group of 1-4 carbon atoms, carboalkoxy or $R^4$ and $R^5$ taken together can be an anhydride linkage (—COOOC—), and $R^6$ is selected from hydrogen, vinyl, an alkyl or alkenyl group having 1 to 12 carbon atoms, cycloalkyl, carboalkoxy, alkoxy-alkyl, alkyl carboxy, ketoxy, halogen, carboxy, cyano or pyridyl and n is a whole number between 0 and 9.

The general formula set forth includes by way of example, homopolymers such as polystyrene and monochloropolystyrene, the modified polystyrenes, such as rubber-modified, high-impact polystyrene and styrene containing copolymers, such as the styrene acrylonitrile copolymers, styrene butadiene copolymers, styrene-acrylonitrile-alkyl styrene copolymers, styrene-acrylonitrile-butadiene copolymers, polymethylstyrene, copolymers of ethylvinylbenzene, and divinylbenzene; styrene-maleic anhydride copolymers; styrene-butadiene-styrene block copolymers and styrene-butadiene block copolymers; and styrene-butadiene-styrene maleic anhydride block copolymers.

The flame retardant polyphenylene ether styrene resin blends preferably have from 40 to 60 parts by weight of polyphenylene ether and 60 to 40 parts by weight of styrene resin per 100 parts of polyphenylene ether-styrene resin.

The flame retardant blends of the present invention can include reinforcing fillers such as glass roving, glass fiber, mineral clay, mica, and silica; also plasticizers, impact modifiers, antioxidants, and flow promoters. The reinforcing fillers can be present at from 5 to 50 parts by weight of filler, per 100 parts by weight of blend. The compositions of the present invention can be prepared by blending in a Henschel mixer and thereafter compounded in a Werner-Pfleiderer extruder. The extrudate can be chopped into pellets and molded on a Newbury injection molding machine.

Iron halides which can be utilized in the practice of the present invention are, for example, ferric chloride, ferrous chloride, ferric bromide, ferrous bromide, ferric iodide and ferrous iodide.

The iron halides can be employed at from 0.05 to 5 parts by weight per hundred parts by weight of blend and preferably from 0.3 to 2 parts by weight of iron halide per hundred parts by weight of blend.

In order that those skilled in the art will be better able to practice the invention, the following example is given by way of illustration and not by way of limitation. All parts are by weight.

EXAMPLE

A series of polyphenylene oxide (IV 0.4–0.46)-HIPS (American Hoechst AH1897) blends were dry blended with various iron salts. The ingredients were compounded at 600°–610° F. using a W.P. twin screw extruder and injection molded at about 565° F. into either 5"×0.5"×0.125" or 5"×0.5"×0.0625" bars using a 4 ounce Newbury injection molder with a general purpose screw. The iron salts utilized in the blends, were employed at from about 0.1 part to 3 parts, per 100 parts of polyphenylene ether-styrene resin blend. The polyphenylene ether-styrene resin blend was utilized over a range of from about 40 parts of polyphenylene ether and 60 parts of the polystyrene resin, referred to hereinafter as "HIPS" to equal parts by weight of the polyphenylene ether and the HIPS. The following results were obtained with blends having equal parts by weight blends of the polyphenylene ether-HIPS:

TABLE

| Iron Halides (pph) | Notched Izod (ft-lbs/in) | TYS[a] (psi) | TE[b] (%) | 1/16" UL-94 FOT (sec) | Rating | 1/8" UL-94 FOT (sec) | Rating |
| --- | --- | --- | --- | --- | --- | --- | --- |
| — | 3.6 | 8890 | 25 | 24.0 dr | Fail | 34.5 dr | Fail |
| .31 FeBr$_3$ | 4.2 | 8890 | 22 | 11.3 | V-1 | 9.4 | V-1 |
| .33 FeBr$_3$ | 4.2 | 8950 | 24 | 3.3 | V-0 | 3.1 | V-0 |
| 1.00 FeBr$_3$ | 4.1 | 9260 | 20 | 2.4 | V-0 | 3.0 | V-0 |
| .34 FeBr$_2$ | 4.3 | 8900 | 24 | 15.3 | V-1 | 10.5 | V-1 |
| .18 FeCl$_3$ | 3.7 | 8720 | 27 | 25.0 | Fail | 2.5 | V-0 |
| .55 FeCl$_3$ | 2.9 | 9150 | 22 | 14.4 | V-1 | 7.4 | V-1 |

[a]TYS—Tensile Yield Strength
[b]TE—Tensile Elongation

As shown by the above Table, incorporation of from about 0.18 part to 1 part of iron halide into the equal part by weight blend of polyphenylene ether and HIPS significantly improves the flame retardant properties of the resulting blend while not adversely affecting its physical properties.

It was further found that the employment of 0.1 part of FeCl$_2$, per 100 parts of an equal part polyphenylene ether-HIPS blend resulted in a flame retardant composition having a flame-out time of 6.1 seconds. The addition of up to 3 parts of FeCl$_2$ resulted in the production of a flame retardant blend having a flame-out time of 8.8 seconds. Moreover, a variety of iron salts, such as ferric acetate, ferric oxalate, ferric citrate, ferrous gluconate, ferric stearate, and compounds such as ferric oxide, which were employed in proportions of from 0.27 part to 1.89, parts per 100 parts of equal part blend, resulted in blends which dripped under the conditions of the UL-94 test and had flame-out times of from 12.4 to 22.1 seconds. However, when ferric stearate was combined with an effective amount of brominated polystyrene, a flame retardant composition resulted having a V-1 rating and a flame-out time of 9.3 seconds.

Although the above show only a few of the very many variables which can be utilized in the practice of the present invention, it should be understood that the present invention is directed to a much broader variety of flame retardant compositions utilizing different polyphenylene ether-polystyrene resin blends as well as the use of iron halides over a much broader weight proportion range, as shown in the description preceding this example.

What is claimed and sought to be protected by Letters Patent of the United States is as follows:

1. Flame retardant polyphenylene ether styrene resin blends comprising,
   (a) a polyphenylene ether,
   (b) a polystyrene resin, and
   (c) from 0.05 to 5 parts of an iron halide per hundred parts weight of the blend.

2. Flame retardant compositions in accordance with claim 1, comprising, from about 40 to 60 percent by weight of polyphenylene ether, and from about 60 to 40 percent by weight of polystyrene resin.

3. A composition in accordance with claim 1, where the iron halide is ferric bromide.

4. A flame retardant composition in accordance with claim 1, where the iron halide is ferrous bromide.

5. A flame retardant composition in accordance with claim 1, where the iron halide is ferric chloride.

6. A flame retardant composition in accordance with claim 1, where the iron halide is ferrous chloride.

7. A flame retardant composition in accordance with claim 1, where the polyphenylene ether consist essentially of chemically combined units of the formula,

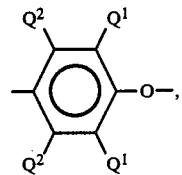

where in each of said units, independently, each $Q^1$ is halogen, primary or secondary lower alkyl, alkenyl, phenyl, haloalkyl, aminoalkyl, glycidyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

8. A flame retardant composition in accordance with claim 1, where the styrene resin is high impact polystyrene.

* * * * *